Jan. 27, 1953 V. H. PAVLECKA ET AL 2,626,501
GAS TURBINE POWER PLANT HAVING COMPRESSOR, TURBINE, AND
HOLLOW SHAFT THEREBETWEEN
Filed Oct. 7, 1944 8 Sheets-Sheet 8

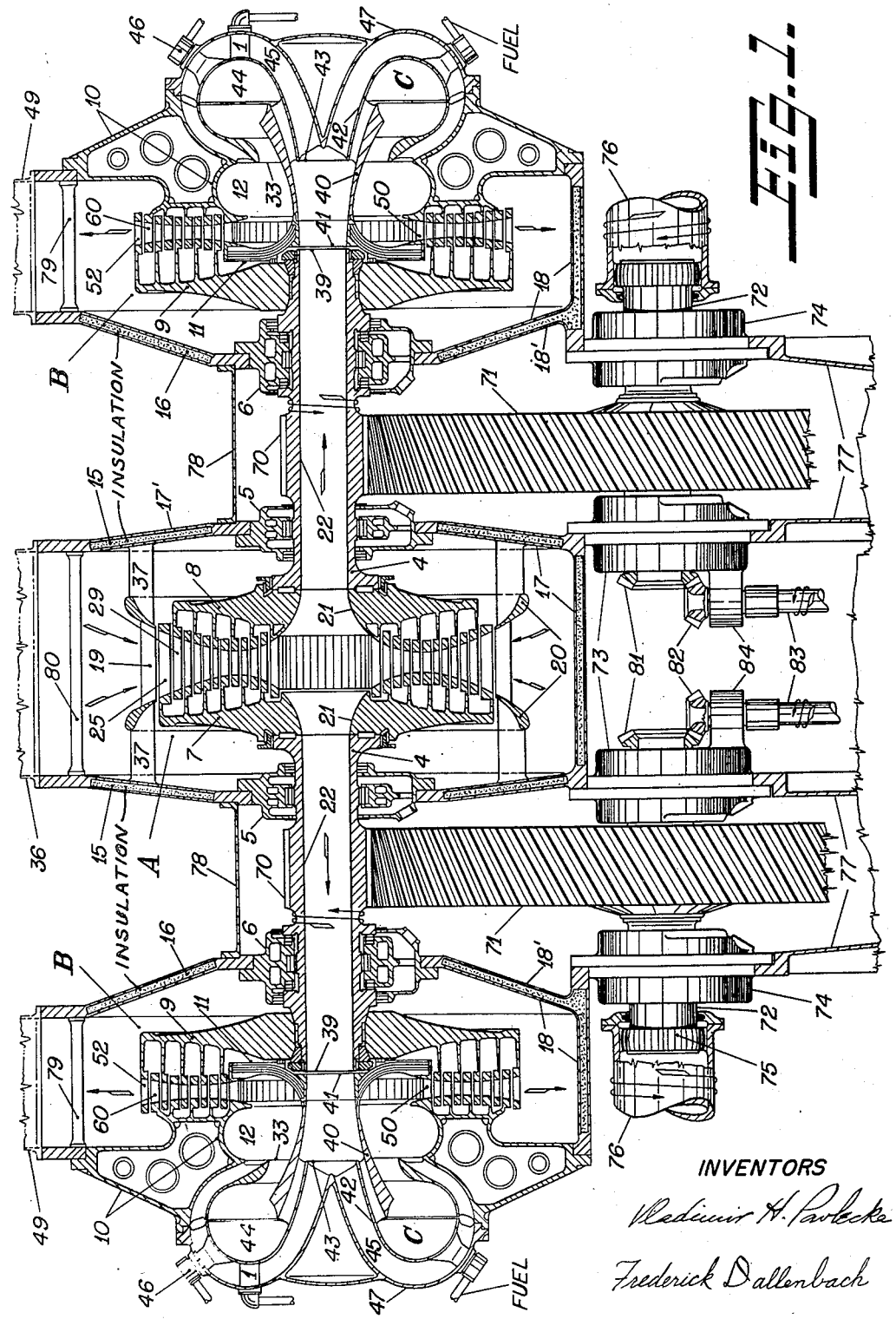

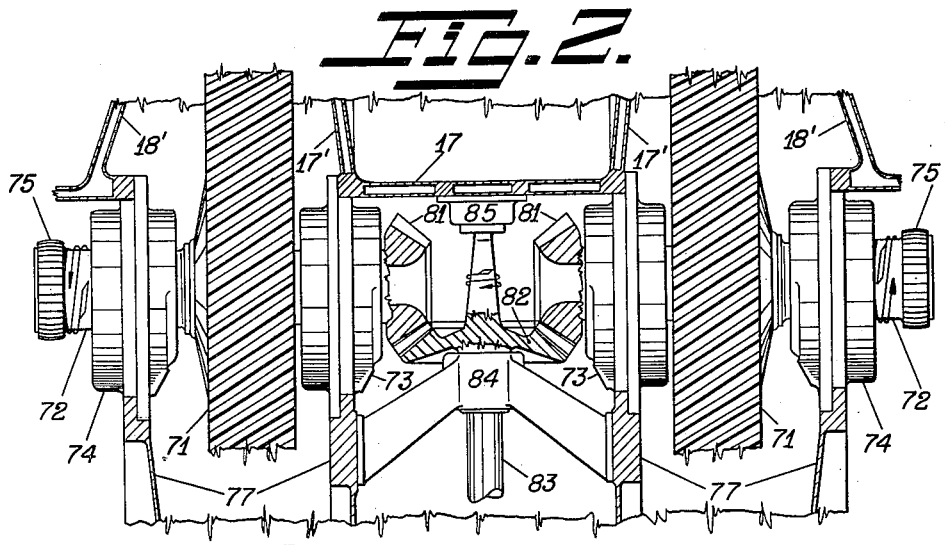
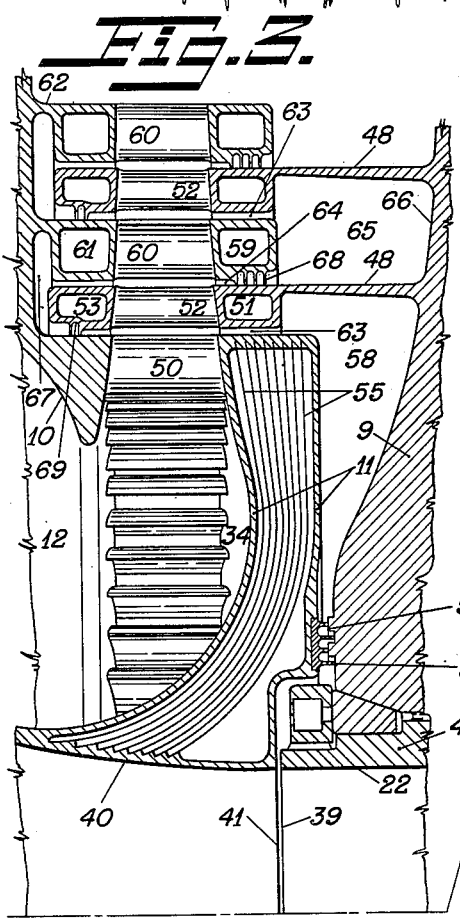
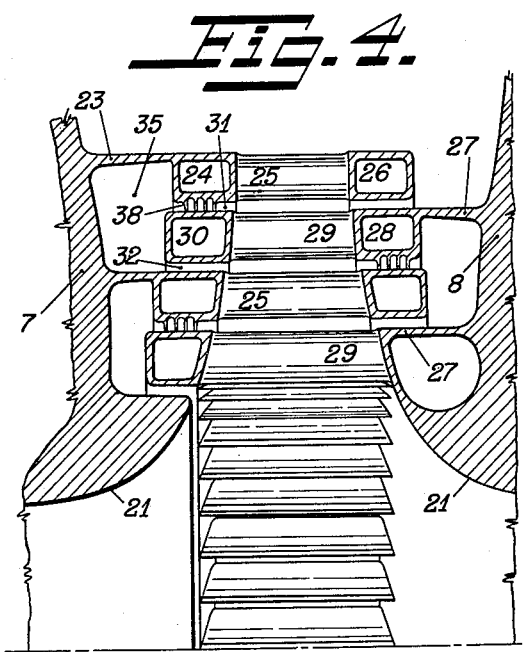

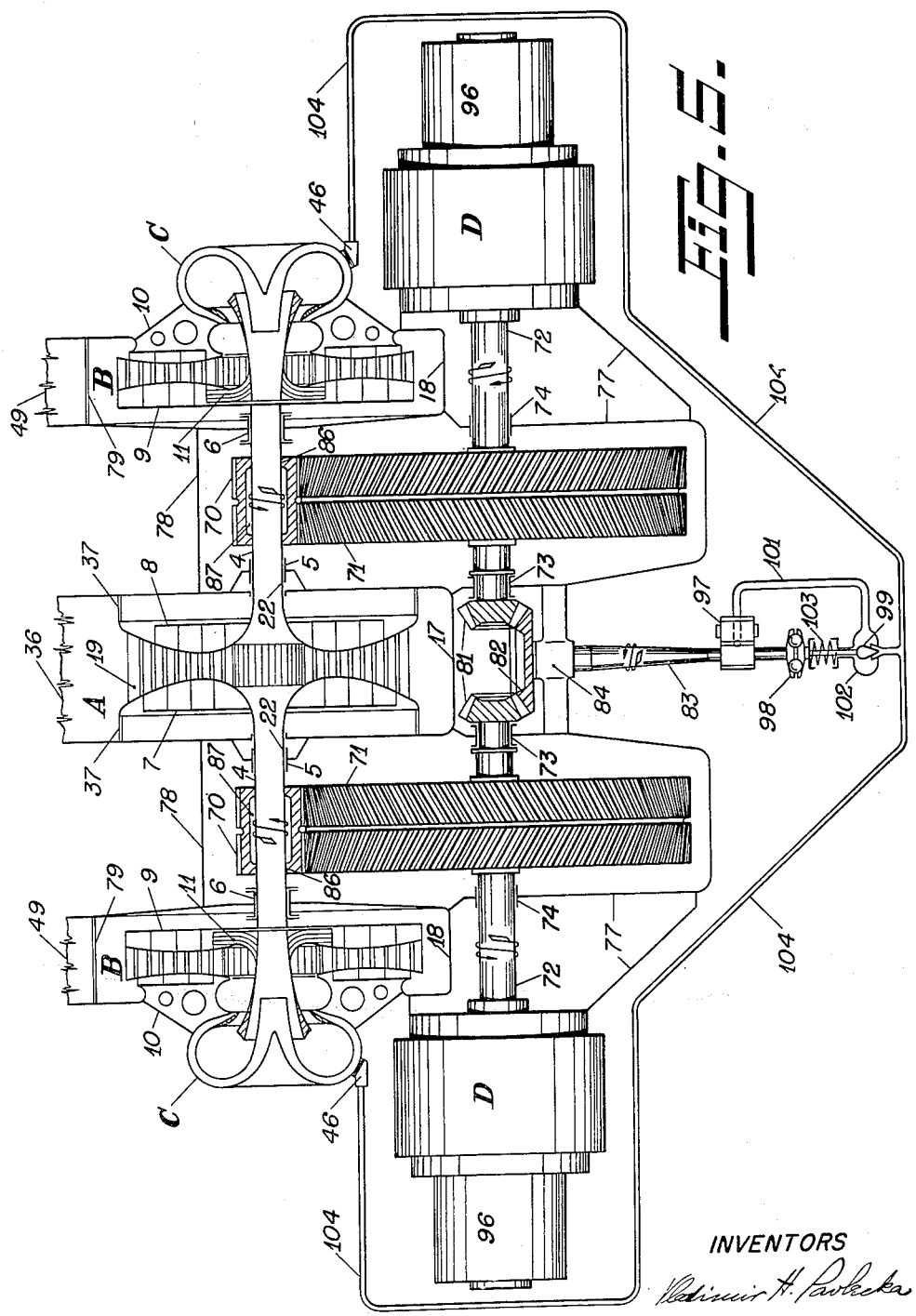

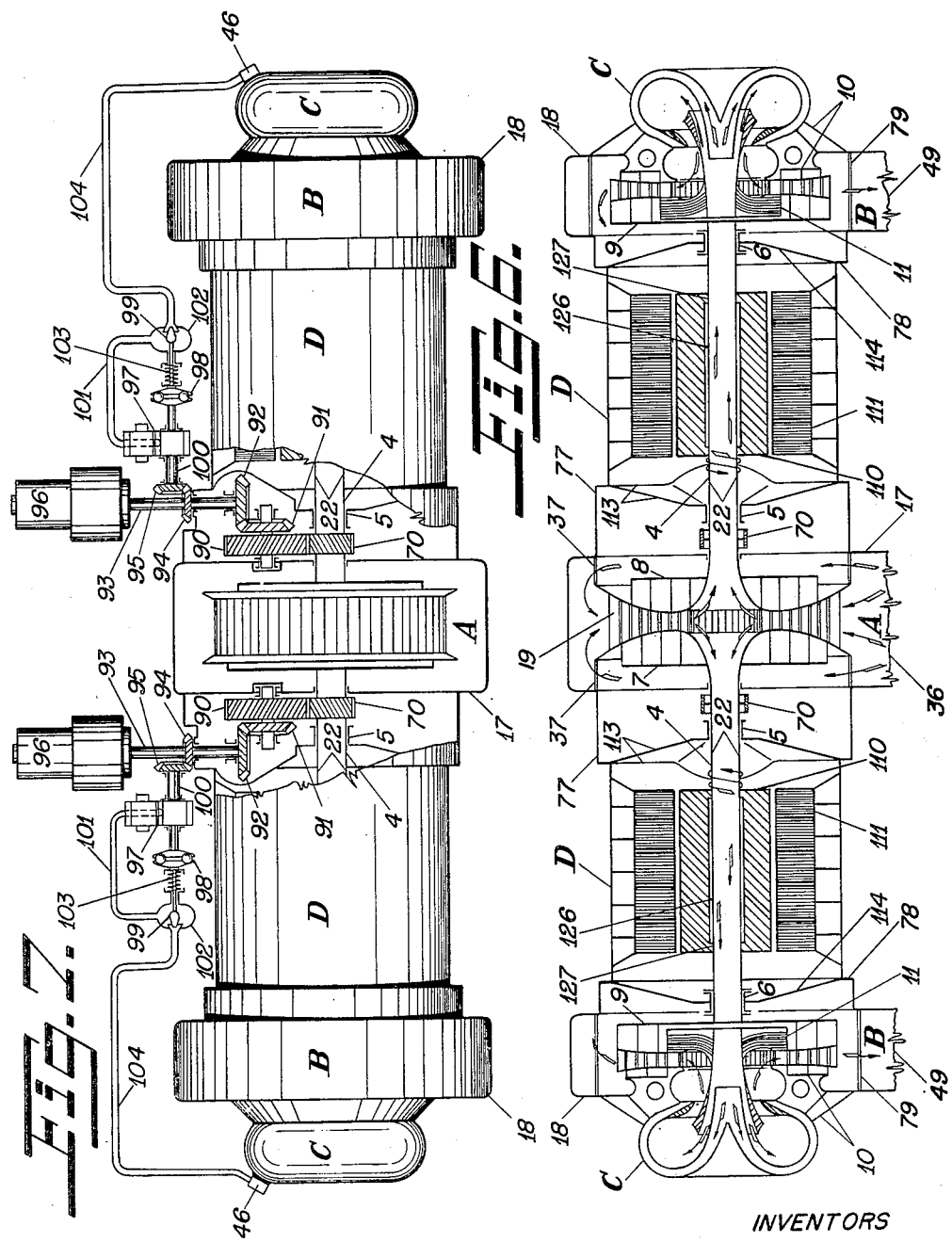

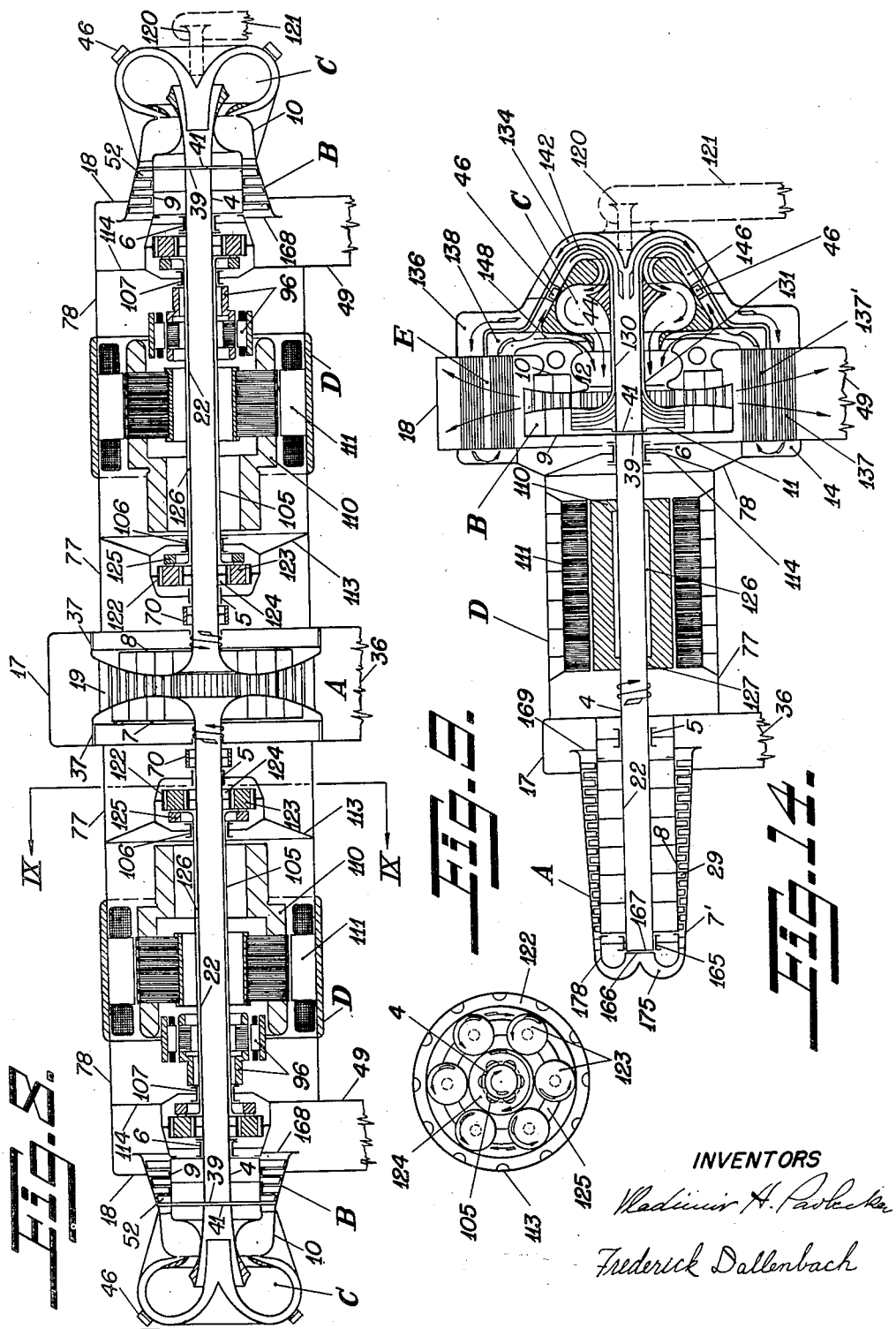

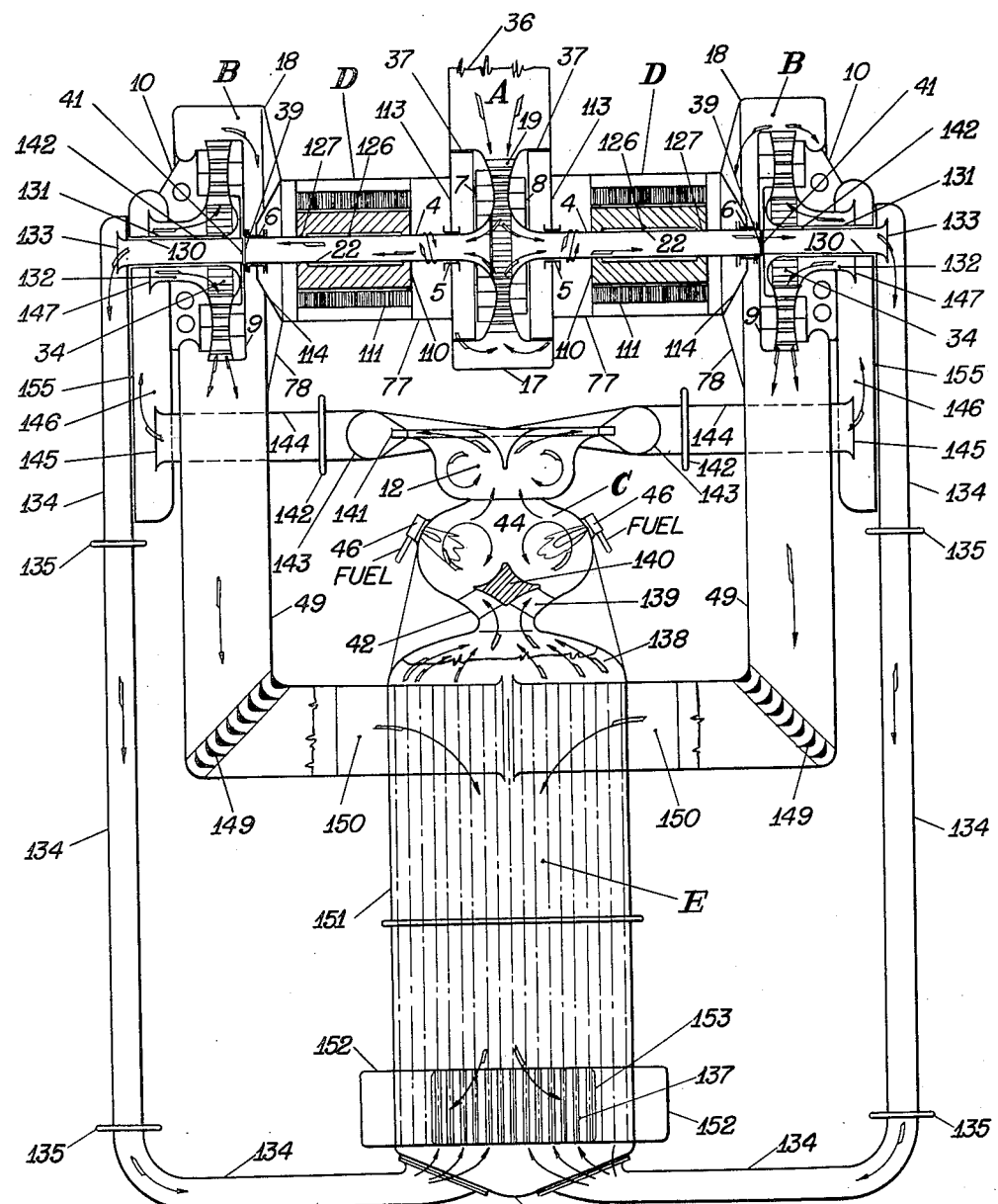

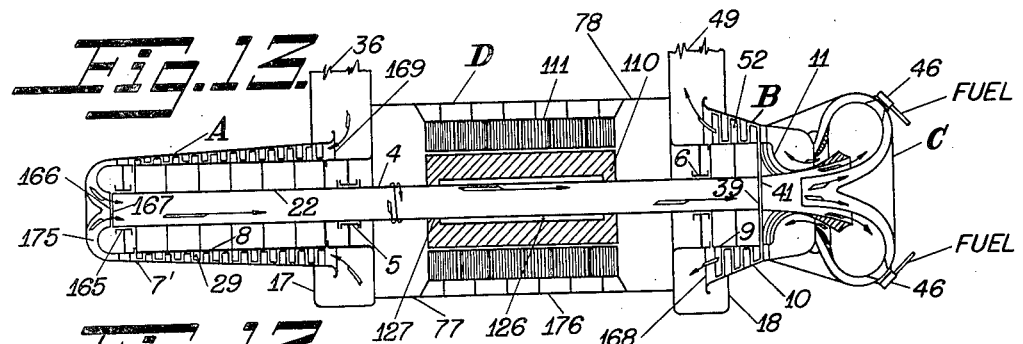
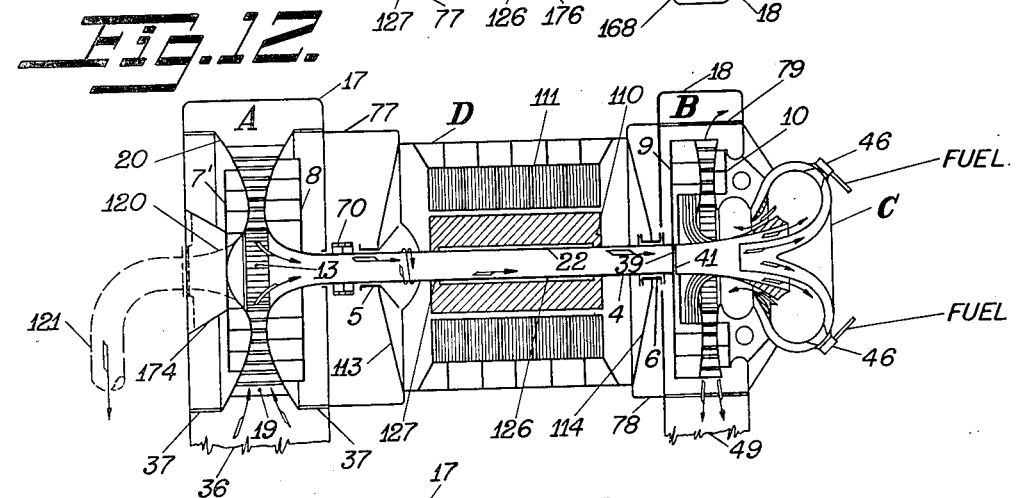
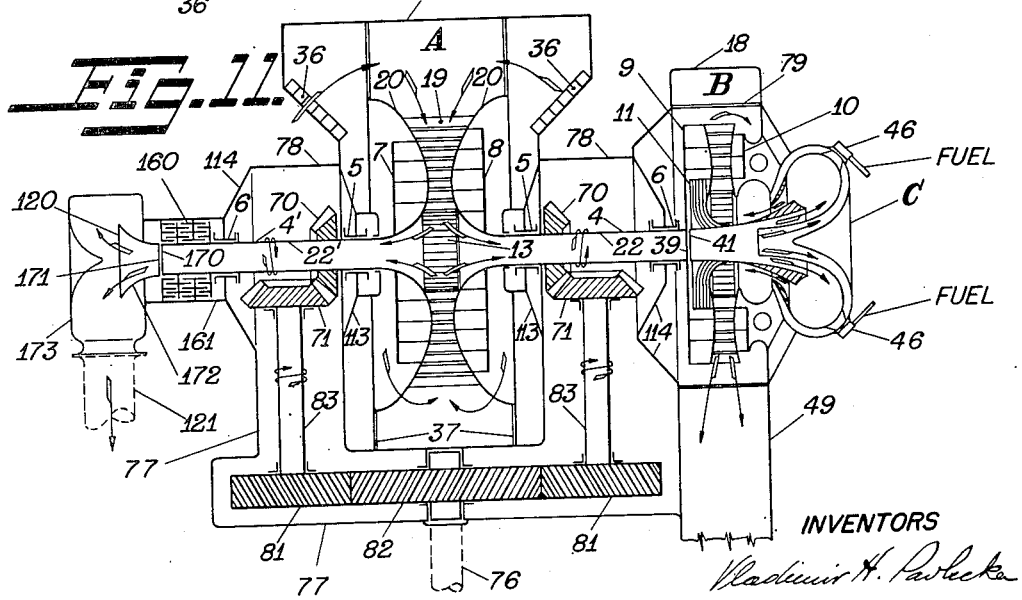

INVENTORS
Vladimir H. Pavlecka
Frederick Dallenbach
By Lyon & Lyon attorneys

Patented Jan. 27, 1953

2,626,501

UNITED STATES PATENT OFFICE 2,626,501

GAS TURBINE POWER PLANT HAVING COMPRESSOR, TURBINE, AND HOLLOW SHAFT THEREBETWEEN

Vladimir H. Pavlecka, Pacific Palisades, and Frederick Dallenbach, Inglewood, Calif., assignors to Turbolectric Corporation, Beverly Hills, Calif., a corporation of California Application October 7, 1944, Serial No. 557,655

34 Claims. (Cl. 60—39.15)

This invention relates to a system of gas turbine power plants of the continuous combustion type.

It is an object of this invention to provide a gas turbine power plant having a dynamic air compressor mounted on one end of a hollow shaft, and a gas turbine at the other end of the same shaft, and a combustion heat generator located at the turbine's end of said shaft, the turbine driving the compressor through said hollow shaft.

It is also an object of this invention to provide a gas turbine power plant having two hollow shafts, a contra-rotatable centripetal compressor mounted at the inner ends of said shafts, a radial turbine at the outer end of each shaft for rotating the two sides of said compressor in opposite directions, and a combustion heat generator at the outer end of each shaft.

Still another object of this invention is to provide a gas turbine power plant having two hollow shafts, a contra-rotatable centripetal compressor mounted at the inner ends of said shaft, a radial turbine at the outer end of each shaft for rotating the two sides of said compressor in opposite directions, a heat exchanger aerodynamically connected to the outer ends of both shafts for receiving air from said compressor and supplying it, after preheating, to a combustion heat generator, and two ducts connecting the output of said generator to the input sides of the turbine.

It is an additional object of this invention to provide a gas turbine power plant having a contra-rotatable centripetal compressor mounted at the inner ends of first and second shafts, at least the first shaft being a hollow shaft, a turbine connected to the outer end of the first shaft, a combustion heat generator aerodynamically coupled to the outer end of the first shaft on the input side and to the input side of said turbine on the output side, and a gear train interconnecting the two shafts for rotating the two sides of the compressor in the opposite directions with the aid of such turbine and said two shafts.

It is also an object of this invention to provide an axial compressor discharging into one end of a hollow shaft, a combustion heat generator aerodynamically coupled to the other end of the hollow shaft, and a turbine mounted at the opposite end of the shaft, said turbine driving said compressor with the aid of gases leaving said heat generator.

Another object of this invention is to provide a gas turbine power plant having a contra-rotatable compressor, one side of said compressor being driven by a turbine supplying the external as well as the internal load, and the other side of the compressor being driven by a turbine supplying only the internal load.

A further object of this invention is to provide a gas turbine power plant system which is advantageously adaptable, without change of the basic principles of the novel method of arrangement, to a plurality of power generating units and combinations thereof.

Another object of this invention is to provide a gas turbine power plant system in a self-contained, monobloc unit machine of light weight, high thermal efficiency, durability, compactness, simplicity and low cost.

Another object of this invention is to provide a gas turbine power plant system distinguished by broad operational characteristics and controlability of speed, output, thermal efficiency and by the ease of starting.

The gas turbine system features a combination of double rotation centripetal compressor which delivers compressed air into two hollow, oppositely rotating shafts, each shaft mounting one rotor of the centripetal compressor at one end and each shaft having a single rotation centrifugal turbine mounted on the opposite end from the compressor, whereby each turbine drives one rotor of the double rotation compressor and each turbine receives as the working fluid, hot gases from its own combustion heat generator which is located at the turbine end of the hollow shaft duct and which forms a part of the turbine stator housing. In this preferred embodiment of the system therefore, one compressor supplies two combustion heat generators operating in parallel and these in turn are ducted to two turbines, likewise operating in parallel. In machines incorporating the centripetal compressor and the centrifugal turbine, one gains a distinct structural advantage in not needing any external cylinder casings for the compressor and for the turbines, exposed to high pressures at elevated temperatures.

Another advantageous method can be practiced with the disclosed power plants in which one turbine is larger than the other turbine, the larger turbine producing all the external power at constant speed of rotation and driving one rotor of the centripetal, double rotation air compressor, while the smaller turbine drives only the other rotor of the centripetal, double rotation compressor at variable speed in a direct functional relation to the external load demand, as disclosed more fully later in this application.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Fig. 1 shows an elevational cross section view of a double rotation continuous combustion gas turbine featuring a centripetal, double rotation compressor, two tubular duct shafts leading to two heat generators and two centrifugal turbines, rotating oppositely, the tubular shafts being adapted for mechanical drive by gears;

Fig. 2 shows a fragmentary cross section of an alternative arrangement of a gear train of Fig. 1;

Fig. 3 shows an elevational fragmentary cross section of a portion of a centrifugal, single rotation turbine;

Fig. 4 shows an elevational fragmentary cross section of a detail of a centripetal, double rotation air compressor;

Fig. 5 shows a schematic elevational cross section of the power plant illustrated in Fig. 1, and including two oppositely rotating electric generators, and a simplified method of governing;

Fig. 6 shows a schematic elevational cross section of a double rotation, continuous combustion gas turbine power plant for generation of alternating current in two oppositely rotating alternators;

Fig. 7 shows a schematic plan view of a double rotation power plant, including two oppositely rotating alternators, a simplified method of governing and connections for driving an excitation generator;

Fig. 8 shows a schematic cross section of the centripetal air compressor and oppositely rotating turbines delivering mechanical energy by planetary reduction gear trains to two oppositely rotating direct current generators;

Fig. 9 shows schematic fragmentary detail axial view of the planetary gear train, the view being taken at approximately line IX—IX of Fig. 8;

Fig. 10 shows a schematic elevational cross section of a gas turbine power plant similar to that disclosed in Figs. 6 and 7 but including a compressor discharging into externally located counter-flow heat recuperator;

Fig. 11 shows a schematic elevational cross section view of a power plant, featuring a centripetal, double rotation compressor driven by a single radial turbine;

Fig. 12 shows a schematic elevational cross section view of a gas turbine power plant using a single rotation centripetal compressor and a centrifugal turbine driving directly the compressor and an alternator;

Fig. 13 shows a schematic elevational cross section view of a gas turbine power plant using an axial flow compressor, a tubular duct shaft, a heat generator and an axial flow turbine driving directly the compressor and an alternator;

Fig. 14 shows a schematic elevational cross section view of a gas turbine power plant featuring an axial flow compressor and a centrifugal turbine in combination with an integrally built cross flow heat recuperator, the turbine driving directly an alternator;

Figure 16:
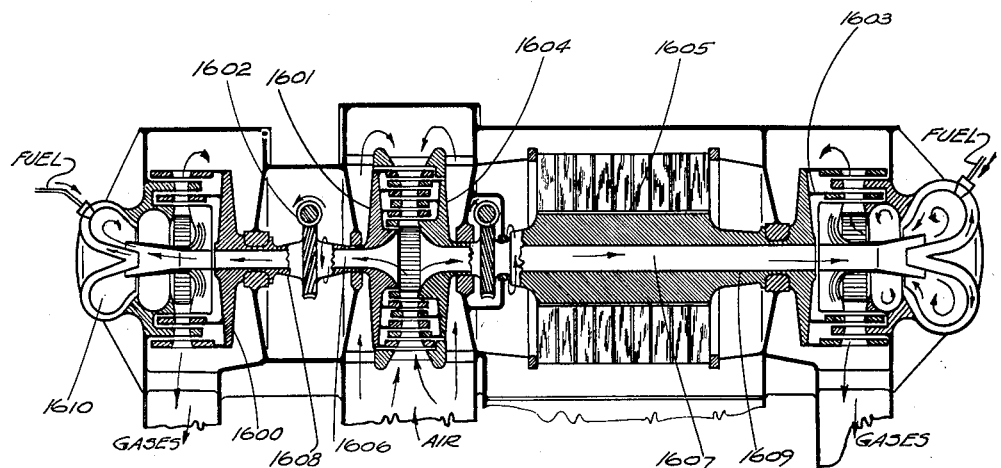
Fig. 16 is a vertical cross-sectional view of a power plant of the type illustrated in Fig. 15, in which the load is an electric generator whose rotor is mounted directly on one of the shafts of the power plant.

Referring now to the drawings, the items shown on each drawing are numbered in such a way that identical parts are designated only by one identifying number, even if used on both, the left side and the right side of the double rotation machines, while the left-hand and the right-hand parts are designated by different numbers; this method of identification eliminates confusion and also indicates that a large proportion of parts, composing the power plant is mutually interchangeable. Complete assembly groups of the machines, constituting the principal elements of the gas turbine aggregate, are designated by capital letters of the alphabet, regardless of type of construction they may represent, i. e., either radial or axial flow turbo machines. In the interest of numerical simplicity, parts of the same species, although of different form, are designated by the same numbers on different drawings, e. g., part 70 in Fig. 1 designates a gear species of spiral spur type, while part 70 in Fig. 11 designates a gear species of spiral bevel type.

Turning now to Fig. 1, the illustrated gas turbine power plant is of the high pressure cycle, double rotation system, consisting of a multistage, double rotation, centripetal compressor A, driven by two identical multistage, single rotation, centrifugal turbines B, each turbine driving one rotor of compressor A in opposite sense of rotation.

The double rotation, centripetal compressor discs 7 and 8 are connected to their respective driving centrifugal turbines B by tubular shafts 4. Each shaft 4 is supported rotatably in a plain radial bearing 5 and in a combination radial-axial thrust bearing 6, all bearings being held by stator structures of air intake hood 17 and of gas exhaust hood 18, respectively. The inward end of shafts 4 are rigidly coupled to compressor discs 7 and 8, respectively, by detachable mechanical means. Each compressor disc, 7 and 8, contains a funnel-like, axially disposed and centrally located duct 21. The contour of each duct 21 is preferably of a rectangular hyperboloid form, merging fluently and smoothly into a cylindrical duct 22 of each shaft 4. Fig. 4 illustrates a portion of the compressor in greater detail; the compressor disc 7 is provided on its inward face with concentric, peripherally integral and elastically flexible cylindrical rings 23, extending axially from disc 7 toward and fused by welding with circumferential blade-retaining hoop-rings 24; one side of compressor blades 25 is welded to the hoop-rings 24.

While one end of the blades 25 is thus held and supported by the inner hoop-rings 24, the other end of the same blades is held and supported by the circumferential outer hoop-rings 26, thereby imparting a high order of stability and rigidity to the compressor blades. Similarly, compressor disc 8 is provided on its inward face with concentric, peripherally integral and elastically flexible cylindrical rings 27, extending axially from disc 8 toward, and fused by welding with, circumferential blade-retaining hoop-rings 28. Compressor blades 29 are held by the hoop-rings 30 and 28.

The compressor cascade system 24, 25, 26 mounted on the inward face of disc 7, interleaves in the radial direction with the compressor cascade system 28, 29, 30 mounted on disc 8, in such a manner that the radial spaces or gaps 31 and 32, between the alternately positioned counter-rotating radial cascades or stages, are predetermined by their diametral dimensions and also are so positioned axially by the thrust and locating bearings 6, that the inward walls of the cascade retaining rings 26 and 28, together, and the inward walls of the cascade retaining rings 24 and 30 together, form smoothly curved and substantially radial channel walls for ducting radially inward the air which is being compressed by the blading cascades 25 and 29. The air to be used in the combustion turbine cycle enters either in its atmospheric state or already precompressed, by duct 36 into a compressor intake hood 17, surrounding peripherally the compressor rotor assembly. The air in the intake hood 17 is moving at relatively low velocities toward a stationary prerotation stage 19, peripherally surrounding the first stage of the rotating cascade 25; this prerotation stage cascade 19 is held in position by two circumferential shrouding rings 20, secured by a number of radial brackets 37 to the walls of the air intake hood 17, the shrouding rings 20 at the same time forming a gradually accelerating, radial channel entry approach for air flowing to the radial cascades of the compressor A. Entering air is progressively compressed as it passes alternately through the oppositely rotating cascade systems 24, 25, 26 and 28, 29, 30, radially inward from the entry cascade 19 and emerges, in compressed state from the innermost radial blades 29 and is hence forth ducted in opposite directions by hyperboloid walls of the shaft duct entry holes 21 into two ducts 22, each contained in the respective shaft 4.

The walls of ducts 21 serve as highly efficient nozzles to direct the compressed air in axially opposite directions into shaft ducts 22; the compressed air is forced through ducts 22 with a sufficiently high average velocity in order to keep the diametral dimensions of shafts 4, particularly with respect to the bearing diameters, within the usual practical limits of such shafts. Because of high compression ratio and utilization of two shaft ducts and high flow velocities in these ducts, it is possible to have shafts of small diameter. It is well known that in the flow of compressible fluids at subacoustic velocities, the pressure drop in a tube of circular cross section increases with increasing Mach number. Therefore, in order to keep the pressure drop across the tubular shaft ducts 21 and 22 to a minimum, the Mach number should be kept to a low value. Since the temperature of the air is increased by the work of compression, the acoustic velocity in the air flowing in ducts 22 is correspondingly also increased. This fact permits high velocities to be reached in the shaft ducts 22 without increasing the Mach number to the high value which would result in excessive losses. Thus the losses due to the flow through the shafts, in ducts 22, are kept low while at the same time the diametral dimensions of the shafts 4 are kept small.

Each shaft duct 22 terminates in a circular edge 39 in the proximity of the turbine disc 9 at the outward end of shaft 4, and the air enters a stationary diffuser duct 40 at circular edge 41, centrally located in each heat generator C, the velocity of the compressed air being slowed down by diffusers 40 before entering the combustion chamber 44 of heat generator C.

In the embodiment shown in Fig. 1, the flow of compressed air, indicated by the arrows in the referenced drawing, from the compressor A is divided into two, volumetrically approximately equal, streams by the nature of the size of ducts 22 in tubular shafts 4, each duct 22 therefore, passing equal amounts of air per unit of time to each combustion heat generator C. The air flow, arriving from tubular shaft ducts 22 into diffuser ducts 40, is divided into two streams within each diffuser 40 by the presence of internal concentric diffusing duct 45 in each diffuser, originating at circular edge 43 and so proportioned in its cross sectional area with respect to the cross sectional area of diffuser 40, that a predetermined amount of air enters each toroidal combustion chamber 44 and the remainder of the air flow is directed by intermural duct 45 disposed externally to and separated only by a thin wall 42 from toroidal combustion space 44, contained in each heat generator C.

Fuel is injected through a plurality of fuel dispersing nozzles 46 into combustion chamber 44, wherein the combustible mixture of dispersed fuel and compressed air, is burned and the products of combustion are thoroughly mixed by the turbulent motion of the hot gases within the combustion chamber. The mixture of fuel and air in chamber 44 is ignited by means of ignition plugs 1, suitably positioned with respect to the fuel dispersing nozzles 46. Due to the motion of the gases within the combustion space 44, a circular vortex is formed within the toroidal combustion chamber 44. The core of the vortex fills the central portion of the toroidal chamber 44, while gases flowing in the space between the outside surface of the vortex core and the walls 42 of the heat generator C, peel off the surface of the vortex core and discharge through the circumferential opening 33. The compressed air, which enters an outer duct 45 at a circular edge opening 43, leaves duct 45 and joins the hot gases leaving combustion chamber 44. The cooler air in ducts 45 absorbs the heat radiated from and conducted through walls 42, thereby serving the dual purpose of keeping the walls 42 and 47 of heat generator C and a wall 10 of the turbine stator housing at low temperatures.

The cooler compressed air, discharging from ducts 45 through circular opening 33, mixes with the hotter gases emerging from the combustion chamber 44, thereby equalizing the temperature of the gases before they enter into the prerotation stage 50 of the turbine. Mixing is promoted by the vortices formed by the turbulent viscous motion of the two masses of gases merging together beyond the opening 33 and also by the formation of a circular vortex ring within a toroidal mixing chamber 12, adjacent to the walls 10 of the turbine stator housing. The vortex ring, formed in chamber 12, rotates in opposite sense to the vortex ring formed in chamber 44, and is at a much lower temperature than the vortex ring formed in chamber 44. The toroidal mixing chamber 12 and the inner wall of the heat reflector 11, form a channel wherein the hot gases are brought to a uniform velocity, pressure and temperature before they enter a stationary prerotation stage 50. The contour of the wall of the reflector 11, adjacent to the flowing mass of gases, is therefore determined by the shape of the wall 10, adjacent to the surface of chamber 12, in the heat generator C, and by the shape of the walls of the diffuser 40 and thus is related directly thereto.

Referring now to Fig. 3, in conjunction with Fig. 1, in order to protect the hub of turbine discs 9, and the demountable mechanical means securing them to the outer ends of shafts 4, from elevated temperatures in chambers 34, an anti-radiant heat protective shield 11 is provided, containing a proper number of highly polished, heat resistant, thin metallic sheets 55 shaped to a compound curvature to minimize buckling from heat and to serve as radiant energy reflectors and insulators. Furthermore, peripheral air metering edges 56 are provided on each shield casing 11, edges 56 being spaced from ridges 57 on the cascade side of disc 9.

The spacing between the air metering edges 56 and the circumferential ridges 57 is so adjusted that a predetermined amount of cooling air, through the intervening space between the rotating duct circular edge 39 and the stationary duct circular edge 41, is allowed to flow past the circumferential metering edges 56, while expanding radially outward. The cooling air expands approximately to a pressure of gases prevailing in exit gap 63 at the exit edge of the first nozzle cascade 50 of centrifugal turbine B. The temperature of air flowing past the metering edges 56 into each chamber 58, demarcated by the rotating disc 9 and the stationary shield casing 11, is slightly lowered by the expansion of air in said circumferential orifices between edges 56 and disc hub ridges 57, and this factor, and also the presence of a continuous flow of fresh air through chamber 58, provide means for absorbing and carrying away through gap 63, the residual heat that tends to penetrate toward disc 9 from gas distributing chamber 34 at each turbine B.

The nature of the functioning of this turbine cooling arrangement is not affected noticeably by heat dilation of shaft 4 and of disc 9, since the metering edges 56 are axial in their configuration and the thrust and locating bearing 6, determining running clearance of these edges, is located only a short distance away on shaft 4, although sufficiently distant from sources of heat and on the cooler side of disc 9, toward the bearing 6. Each heat protective shield casing 11 also acts as a support for the first stator nozzle cascade 50, forming thereby a very rigid structure with the rest of each heat generator C and each turbine stator 10. Each turbine disc 9 is provided, on its outward face, with concentric, peripherally integral and elastically flexible, rings 48 extending axially from disc 9 toward circumferential inner hoop-rings 51. One end of the turbine blades 52 is welded to the hoop-rings, while the other end is welded to circumferential outer hoop-rings 53, imparting a high degree of rigidity to the rotating turbine blades. Alternately interleaving with turbine rotor blades 52, in the radial direction, are turbine stator blades 60. The stator blades are mounted between two circumferential blade-retaining hoop-rings 59 and 61, the rings 61 being in turn fastened by thin, circumferential rings 62 to the turbine stator 10. The turbine rotor cascade system, comprising blades 52 and blade-retaining hoop-rings 51 and 53, and the turbine stator cascade system, comprising blades 60 and blade-retaining hoop-rings 59 and 61, are assembled in such a manner that the radial spaces or gaps 63 and 64, between the stationary and the rotating hoop-rings permit free rotation of the turbine rotor with respect to the stator. Moreover, the inward walls of the hoop-rings form smoothly curved and substantially radial channel walls for ducting the expanding gases.

The disclosed gas turbine power plant is not limited to the use of a particular method of expansion of gases in the centrifugal turbines; any desired degree of reaction or impulse may be used. This is a very desirable and advantageous characteristic of the centrifugal turbine in conjunction with the principles of the disclosed system, because it allows a broad flexibility of design not possible with the double rotation turbines.

Returning to Fig. 1, the expanded gases exhaust into an exhaust hood 18, and are ducted away by duct 49. Analytical study of the axial thrust forces existing in the disclosed power plant, shows that each turbine disc 9, being generally larger in diameter than either one of the compressor discs 7 or 8, exerts an unbalanced axial thrust force, directed from both turbine ends of the power plant toward the compressor, tending to bring compressor discs 7 and 8 closer together. These forces are resisted by the thrust bearings 6 and can be completely sustained by them. However, in order to provide as small a thrust bearing as possible, and to diminish bearing losses, the two total disc pressures are made to equalize each other, for an automatic and inherent reduction of the axial thrust by proper and selective positioning of the gas seals or labyrinths in the compressor and turbine. Turning to Fig. 3 first, representing a section of the left side centrifugal turbine B, the stage labyrinth sealing glands are provided only on the outer hoop-rings 59, i. e. those next to the turbine disc 9. In case of a 50% reaction turbine, both rotor and stator stage seals would have the same number of labyrinth cells; however, in the case shown in Fig. 3, the turbine being a 30% reaction turbine, it is sufficient by way of illustration, to provide only one labyrinth cell on rotor rings 53, because the pressure drop across the rotor blades 52 is smaller than across the stator blades 60.

As shown in Fig. 3, circumferential interstage chambers 65, adjacent to each turbine disc 9, are deliberately exposed to the lowest available stage gap pressure in their vicinity by omitting the stage labyrinth seals on the inner hoop-rings 51. It will be apparent that gap pressures in the intrastage gaps 63 are lower than the pressures in the interstage gaps 64, the latter being sealed from direct entry into the chambers 65 by the stage labyrinth seals 68. The elastic fluid pressure, acting on radial wall 66 of each turbine disc 9, is, therefore, lower than if the labyrinth cells were provided also in intrastage gaps 63, which would have raised the pressure in chambers 65 to a higher mean value.

The stage labyrinth seals 69 on the inward hoop-rings 53 seal off the higher pressure in the intrastage gaps 63 from entering into the circumferential interstage chambers 67, thereby allowing lower pressure of the interstage gaps 64 to enter into said chambers and exert less pressure on the vertical faces of the stage rings 53. This principle of reducing normal pressures on turbine discs 9 for reducing an axial thrust on shaft bearings 6, is practiced at all stages of the centrifugal turbine.

It is obvious that the above equalization technique can be reversed when the direction of thrust is reversed.

Fig. 4 is an enlarged, fragmentary section of an exit portion of the centripetal compressor A, wherein 7 and 8 are left side and right side compressor discs, respectively, supporting compressor stages 24, 25, 26 and 28, 29, 30 respectively. In order to diminish the axial thrust on bearings 6 from turbine discs 9, it is possible to provide first stage labyrinth sealing glands only at the inner stage hoop-rings, since in this instance, it is desired to obtain as high a normal pressure on discs 7 and 8 as possible to counteract the turbine thrust. Thus, the air from an interstage gap 32, being at higher pressure than in an interstage gap 31, is allowed to enter a circumferential interstage chamber 35, exerting the highest inherently obtainable pressure on the vertical walls of the discs 7 and 8. On the other hand, interstage gaps 31, containing air at lower pressure than gaps 32, are sealed off by stage labyrinth seals 38, thereby inducing a greater axial thrust force in opposition to the thrust forces from turbine discs 9. The above technique may be reversed when the direction of thrust is reversed.

Referring again to Fig. 1, each shaft 4 is equipped with a spiral spur gear pinion 70, either demountably attached to or cut from the solid body of said shafts. The pinions 70 engage spiral spur teeth of bull gears 71 mounted torque-resistantly on shafts 72, each shaft being supported by bearings 73 and 74. These bearings, in turn, are held by a frame structure 77. The attitude of the helix angle of each spiral spur gear 71 may be so selected with respect to pinions 70 as to produce an axial thrust opposite to the prevailing gas or air pressure thrust on bearing 6, originating either in the turbine or in the compressor respectively. This method of reducing the axial thrust can be practiced with the spiral bevel gears as well as with the spiral spur gears.

Since the compressed air, flowing in shaft ducts 22 is at a considerable temperature acquired during its compression, the gear pinions 70 on shafts 4 are at a higher temperature than atmospheric, although considerably below that of compressed air ducted by them. Bearings 5 and 6, supporting each shaft 4, are cooled by lubricating oil and gear pinions 70 are cooled by contact with large bull gears 71, engaging them. Therefore, the hot compressed air, flowing in ducts 22 of shafts 4, present no difficulties whatever to the mechanical embodiment illustrated in Fig. 1.

The machine as a whole is assembled in a metal monobloc housing fabricated by welding of sheet metal forms. It includes a base 77 which supports gear trains, accessory mechanisms, oil pumps, oil collecting sumps, and compressor and turbine hoods 17 and 18. The compressor hood 17 serves a multiple purpose of a structural body supporting bearings for rotors of compressor A, and may have a cylindrical form in its lower portion, and a rectangular shape in its upper portion, the stiffness in this section being augmented by several transverse bars 80, near the inlet duct 36. Another purpose of this hood assembly is to duct air to a compressor intake stage 19 and to provide a sound deadening effect with respect to acoustic disturbances originating in the compressor cascades. The hood structure may have dual sheet metal walls 17 and 17' with an intervening space 15, this space being filled with a sound absorbing material, preferably of a metallic or of a mineral nature.

Similarly, and for the same reason, a dual wall exhaust hood shell 18 may be used for each turbine B, reinforced with bars 79, principally for transferring pressure thrust, acting on each turbine stator 10, to thrust bearings 6. Turbine hoods 18 and compressor hood 17 are held together by shell-like structures 78 extending peripherally around pinions 70, making the whole power plant, together with the rest of the stator structure, an integral monobloc unit. The double rotational nature of the gas turbine system allows a broad choice of operational modes of the power plants. In the preferred embodiment of the power plant, featuring centripetal compressor A of the double rotation type, it is possible, according to one mode of operation, to run the power plant with both tubular duct shafts 4 turning at equal but opposite speeds of rotation of turbines B and with either equal or different torques produced on said shafts. Another mode of operation may be based on equal torques on shafts 4 and different and opposite speeds of rotation. It is also possible to operate the double rotation power plant in any combination of these two modes described hereinabove, e. g., each shaft 4 running at different speed and delivering a different torque, with the two turbines operating at different maximum gas temperatures and constructed of unequal size. Out of this number of possible operational combinations however, only a few are desirable and useful with any given embodiment of the gas turbine system.

Figure 15:
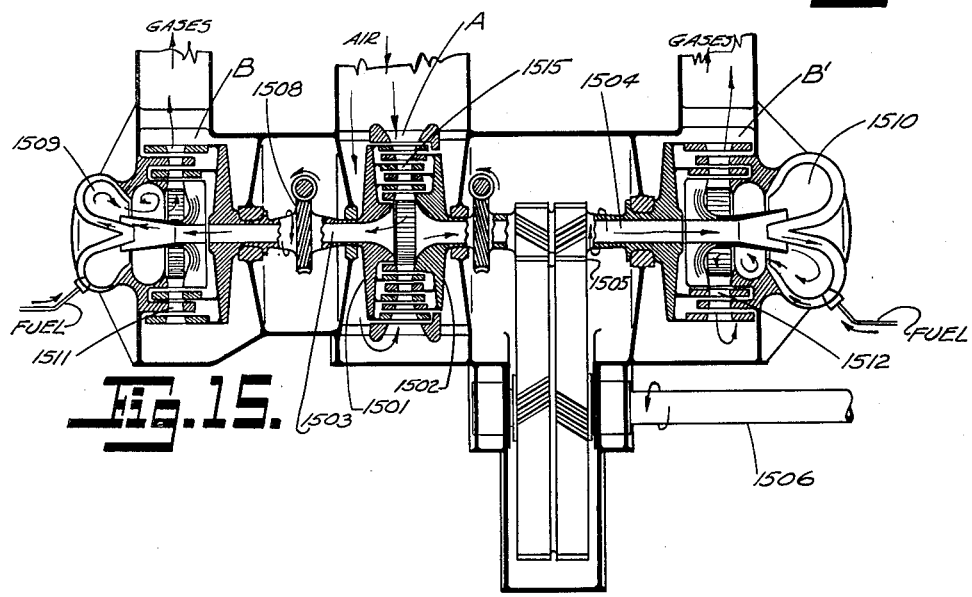
Fig. 15 is a vertical cross-sectional view of a power plant with one turbine being an external power output turbine, while the other turbine being a prime mover for driving power plant auxiliaries, and a regulating turbine.

Thus, for instance, as shown in Fig. 15, it may be advantageous, particularly for aircraft, locomotive and ship propulsion (the latter in combination with controllable pitch propellers) to dimension one turbine B for driving only one rotor disc 1501 of compressor A, and accessory machines by gear train 1508 while the other turbine B', of larger size may be designed to deliver all the useful or external power by means of gear train 1505 and shaft 1506, and also driving the other rotor disc 1502 of compressor A having radial stages 1515. In general, the shaft ducts are not of equal size, one, 1503 being diametrically smaller and the other, 1504, larger, leading to the smaller and to the larger heat generators 1509, 1510 and turbines 1511 and 1512 respectively. The power plant of this configuration can be operated at a variable speed ratio of shaft 1506 to fulfill many loading conditions at high thermal efficiencies, such as arise in all transportation propulsion problems, particularly in aircraft application.

These variations in the modes of operation are indicative of the versatility of its operational freedom, particularly when it is realized that still another means, preferred for stationary power plants operating nearly always at constant output, is available to completely eliminate any need for either torque or speed balancing by external means, as revealed in Fig. 2. This figure shows a gear train scheme for automatic speed equalization of both shafts 76 by means of an internal torque transfer from the less loaded turbine to the more loaded turbine. Again, as before, the inward ends of shafts 72 are equipped with spiral bevel gears 81 engaging jointly a mating spiral bevel gear 82 mounted on a vertical shaft 83 running in bearings 84 and 85, the latter assembled to the structure of compressor intake hood 17'. Shaft 83 is provided for the purpose of driving all necessary accessories. It can be seen that with this gear arrangement, both slow speed shafts 72 as well as the high speed shafts 4, must rotate at their respective equivalent speeds and, therefore, gear 82 serves the desirable purpose of a torque transmitter from one side of power plant to the other side and not only equalizes the speeds of both sides of the power plant, but also distributes the load uniformly to each turbine, even if the external torques on shaft 72 may not be equal.

Fig. 5 shows schematically a complete gas turbine power plant utilizing the contra-rotating principle, the radial flow turbo machines, and the centripetal compressor, all of which have been described in greater detail in connection with Figs. 1, 2, 3, and 4. In this figure, shafts 72 are connected to electric generators D with their individual exciters 96, although it should be understood that any relatively slow running power consumer could be driven in lieu of these generators. The generators D may be also used for setting the power plant into motion during starting, when they operate as motors obtaining power from an external source of electric energy.

Shafts 72 are mutually synchronized, substantially as revealed in Fig. 2, by a train of spiral bevel gears 81 and 82, of which gear 82 drives shaft 83 in bearing 84, delivering power to the auxiliaries. Only a fuel pump 97 and a speed governing regulator 98 illustrate the auxiliary equipment. The fuel pump 97, preferably of a gear type, delivers fuel to a governing system shown in a highly simplified manner. Pressure conduit 101 leads to a throttling valve 99 contained in an orifice chamber 102; fuel throttling valve 99, tending always to open because of the force exerted by a compressed spring 103, which operates against a balancing force of a speed regulating governor 98 driven from shaft 83, admits a desired amount of fuel to maintain a constant speed of rotation of turbines B. The fuel follows two pressure conduits 104, leading to the fuel dispersing nozzles 46 mounted on each combustion heat generator C. It is apparent that in this arrangement, the power plant, although of the contra-rotating type, operates as a single rotation unit, responding only to one governor and transmitting the differential torques through gear 82, in order to maintain constant and equivalent speed of rotation on both output shafts 72. The fact that it drives two generators instead of only one, is an advantage when the generators are direct current generators because of the relatively low power limits of the single unit direct current dynamos.

In Fig. 5, in order to reduce heat transfer from compressed air flowing in tubular ducts 22 of shafts 4 to gear pinions 70, and thereby still further reduce the heat transfer through the gear pinions 70, they are made to engage shafts 4 only by their outer ends.

Fig. 6 shows an elevational cross section view of the contra-rotating turbine power plant driving two electric alternators D, mechanically independent of one another. A contra-rotating centripetal compressor A is again centrally located with respect to all other components of the power plant. The air, either in its atmospheric condition or pre-compressed, arrives through duct 36 to a compressor intake hood 17 and from it enters, through a prerotation stage 19 held by brackets 37, attached to walls of intake hood 17, compressor A.

The compressor is similar to the centripetal compressor shown in greater detail in Fig. 1, having two oppositely turning rotors 7 and 8. The compressed air enters two tubular ducts 22 in shafts 4, and flows in them in an axially opposite direction to two heat generators C, located at the ends of the power plant. From the heat generators C, the hot gases enter into turbines B, following paths indicated by arrows on drawing of Fig. 6, and after expanding in the turbines are collected in exhaust hoods 18. Beside driving the compressor rotors 7 and 8, the turbines B drive also alternator rotors 110, located on shafts 4 between bearings 5 and 6, said rotors turning in stators 111 of alternators D. In order to eliminate heat transfer from hot compressed air flowing in tubular shaft ducts 22 into the metallic masses of rotors 110, circumferentially hollow cylinder-like chambers 126 are provided between the rotors 110 and the outer wall of each shaft 4. Rotors 110 are supported and secured on shafts 4 by two inwardly projecting circumferential abutments 127, one at each end of the rotor 110, the intervening hollow cylinder-like cavities 126 being ventilated by air or hydrogen, entering through suitable ducts at each end of the rotors and leaving through the radial holes provided in the rotors 110.

Fig. 7 shows a plan view, partially cross sectional, of a machine pictured in Fig. 6, to reveal features not indicated in the latter drawing. Each shaft 4 is shown with a spiral spur gear pinion 70 secured to it, engaging larger gear 90 which in turn rotates a spiral bevel gear train 91 and 92 delivering power to a shaft 93, each shaft 93 connected to direct current exciter 96. These exciters are intended also for setting the gas turbine power plant into motion during starting, their size being sufficient due to at least three inherently superior features of the disclosed power plant. Foremost among them is the improved starting characteristic of the contra-rotating centripetal compressor as disclosed in the copending application, Serial No. 179,028, filed August 12, 1950. Second reason is the small pressure drop in ducts 22 and particularly in the heat generators C. Third reason is the small volumetric content of ducts 22 and of heat generators C, which allows a rapid rise of pressure during starting periods, thereby materially shortening them. It will be appreciated by those skilled in this art that all these advantages are absent in the present day gas turbine power plants.

Each shaft 93 drives a spiral bevel gear train 94 and 95 and thereby a shaft 100, to which is connected a fuel gear pump 97, each pump 97 delivering fuel to an individual governing system, shown in a simplified manner in Fig. 7. Pressure conduits 101 lead from pumps 97 to individual fuel throttling valves 99, contained in orifice chambers 102; throttling valves 99 tend always to open by the force of compressed springs 103, operating against the balancing forces of speed regulating individual governors 98, driven also from shafts 100, each governor admitting a desired amount of fuel to the corresponding heat generator C, supplied by it. The fuel governing or metering combination 98 and 103 may be so preset as to maintain independently a constant speed of rotation of both turbines B at all loads on alternators D, by admitting fuel into fuel conduits 104 and nozzles 46 at the rates proportional to the external load demand on the respective alternator. Although several nozzles 46 are used in each heat generator C, only one is indicated for simplifying the drawing. It will be appreciated that governors 98 can be adjusted so accurately as to maintain both alternators D in perfect electrical synchronism at all loads, within the limits of the maximum output of the power plant.

Although the alternators D in Fig. 6 are mechanically independent of one another and are electrically synchronized by their governing systems, they can be synchronized mechanically as well, by incorporating the principles of the gear torque transfer mechanism illustrated in Fig. 5 in combination with the embodiment shown in Fig. 6, thereby making possible a differential torque transfer from one alternator to the other by relatively light gear trains; the resultant advantage of this arrangement is that only one electric machine 96, for excitation and starting purposes, is required, and also only one governing system is necessary.

Although the gas turbine power plant disclosed in Fig. 6 may use only one alternator, the illustrated arrangement constitutes the most direct solution of power generation, particularly meritorious for use with variable density or closed thermodynamic cycles. The gas turbine embodiment shown in Fig. 6 has unique quality according to which the power generation at constant speed and variable power demand is accomplished by maintaining one alternator fully loaded, by the basic line load, with the turbine, driving it, operating at constant temperature while the other alternator is operated at fluctuating load demand but at constant speed by varying the maximum temperature in the heat generator supplying it with gases.

Another mode of operation consists of an arrangement shown in Fig. 16 wherein the turbines 1600 and 1603 are not constructed of equal size as in Fig. 6, but instead, preferably the left side turbine 1600 is made just large enough to drive only one compressor rotor disc 1601 (the larger of the two compressor rotors and therefore, the one requiring more power) at either constant or variable speed, and to produce no external useful power; the left side shaft is free, without an alternator or any other external power consumer mounted on it, except a gear drive 1602 for auxiliaries. The other turbine, turbine 1603, is constructed large enough to drive the other compressor rotor disc 1604 (the smaller of the two compressor rotors and therefore, the one requiring less power) and in addition, an alternator 1605, at constant speed, the alternator delivering all the useful power produced by the power plant. The two air ducts 1606 and 1607 in shafts 1608 and 1609 are not of equal area size, the duct 1608, leading to the smaller heat generator 1610 and to the smaller turbine 1600, being in general smaller and the duct 1609, leading to the larger heat generator and to the larger turbine 1603, being in general larger. This, and the previously described modes of operation, are preferred for operation with open cycles operating at fluctuating load demands and at constant speed of the power consumer, e. g., alternator 1605, in the interest of maintaining a nearly constant thermal efficiency over large load variations. The contra-rotating, continuous combustion gas turbine power plant can be practiced also in combination with axial flow turbines as illustrated in Fig. 8 instead of the centrifugal turbines, although the axial turbines are generally less efficient, less practical and more expensive than the centrifugal turbines.

Fig. 8 shows the double rotation, centripetal compressor A and two oppositely rotating axial flow turbines B, mounted overhung in centilever fashion on outward ends of shafts 4 with respect to bearings 6. The centripetal compressor A is mounted on oppositely rotating discs 7 and 8, both assembled to the inward ends of shafts 4 which are equipped with circular, internal ducts 22 and each shaft is rotatably supported in bearings 5 and 6. The shafts 4 are equipped with spiral spur pinion gears 70 for the propulsion of necessary auxiliaries and speed governors, similar to those described in connection with Fig. 7 and therefore not illustrated in this figure.

The air, either atmospheric or pre-compressed, arrives from underside duct 36 into compressor intake hood 17, whence it is drawn through pre-rotation cascade 19, held by structural members 37 secured to hood casing 17, into centripetal compressor A. The compressed air is delivered by two ducts 22 into two combustion heat generators C past circular edges 39 and 41, wherein its temperature is increased by burning of fuel arriving through dispersing nozzles 46. It may be desired at times to use a portion of compressed air as pneumatic energy for other purposes, external to gas turbine operation, in which case ducts 120 and 121 may be attached to heat generator C. Similar air withdrawing ducts may be provided at each heat generator C, depending upon the desired amount of compressed air demand. The hot gases from each heat generator C enter an axial flow turbine B, attached to the outward end of each shaft 4, consisting of cylindrical stator 10 and drum rotor 9, expanding in axial flow blading cascades 52 until they reach exhaust hoods 18 in which they are collected and ducted out by preferably underside ducts 49. Surrounding each tubular duct high speed shaft 4 and externally concentric to it, is a slow speed tubular shaft 105, rotatably supported in bearings 106 and 107. On shafts 105 may be mounted any relatively slowly rotating power consumers, such as, by way of example, non-elastic fluid centrifugal pumps, of a single or multistage type, gas compressor of the centrifugal type, vacuum pumps, mechanical or hydraulic transmission drives of all kinds, or as embodied in Fig. 8, direct current generators D, having armatures 110 mounted on shafts 105 and running within stators 111, together with their separate excitation machines 96.

The shafts 105 are driven from shafts 4 either at one end or preferably at both ends, as shown in Fig. 8, by epicyclic gear trains 124, 123, 122. It is well known that such shaft drives, wherein torque is transmitted from both ends of a shaft, which is driven only at one end, to both ends of another, driven shaft, concentrically located with respect to the first, driving shaft, propelling a power consumer attached to it between its ends, can be so proportioned elastically that the gear trains at each end of both shafts are equally loaded. To make the functioning of these gear trains more clear, Fig. 9 shows a schematic, transversely sectional, fractional view of one of the epicyclic gear trains 124, 123, 122. Herein 4 denotes a tubular duct shaft connecting compressor A with heat generator C, having securely attached to it a sun gear 124 engaging a necessary number of planet gears 123, which are rotatably mounted on planet ring 125. Planet ring 125 is torque resistantly attached to an external shaft 105 driving a power consumer, in this case the armature 110 of generator D. The outer ring gear 122 is secured, in all gear trains, to machine stators 77 and 78 by bulkheads 113 and 114 respectively. This well known gear arrangement delivers increased torque to shafts 105 at reduced speed from shafts 4 and makes it readily feasible to attain relatively low rotational speeds of shafts 105 from relatively high rotational speeds of shafts 4, in an extremely small and compact space and with great reliability. The described arrangement has an additional advantage in combination with our invention, in that ventilatible spaces 126 are automatically provided in the intervening radial distance between the outer surface of shafts 4 and the inner surface of shafts 105, thereby substantially decreasing heat transfer from the hot shafts 4 to the outer shafts 105 and thence to the armatures 110 of electric machines D. In case of use of non-elastic fluid pumps as power consumers, this arrangement of dual shafts eliminates also setting up of dangerous temperature gradients and therefore, stresses within shafts 4, which otherwise may appear due to the usual presence of cool fluids handled by such pumps. It will be apparent that the described arrangement of dual shafts and drives can be equally well practiced also in combination with our radial outflow turbines instead of axial flow machines and is shown in Fig. 8 with axial flow turbines only by way of example.

The versatility of the disclosed power plants allows various combinations of the continuous combustion gas turbines with the exhaust heat recuperators located either externally or internally with respect to the power plant. For example, Fig. 10 illustrates a power plant using an externally located exhaust heat recuperator. Since the compressor-turbine combination illustrated in Fig. 10 is substantially identical to that illustrated in Fig. 6, only description of the heat exchange system is necessary. The difference begins at centrifugal turbines B, attached to outward ends of shafts 4, each shaft 4 being equipped with a compressed air duct 22; from these ducts the compressed air flows into stationary ducts 130, serving as extensions of rotating ducts 22, the transition being effected at each outward end of shaft 4 between a rotating duct circular edge 39 and a stationary duct circular edge 41. The stationary air ducts 130 discharge air flow at circular duct edges 133 into external ducts 134 equipped with dilatation compensators 135; two ducts 134 bring the air into a common air pressure manifold 136, forming the bottom of a heat recuperator E. From compressed air manifold 136, the compressed air flows upward through small diameter heat exchange tubes 137, placed in a casing 151, and is brought into a common collecting manifold 138 located at the top of heat recuperator E. The upwardly flowing compressed air is heated, while flowing through tubes 137, by hot gases arriving from the turbine exhaust hoods 18 over ducts 49. Hot gases are turned by elbow cascades 149 into a peripheral distributing hood 150, at the top of heat recuperator E, then enter the heat recuperator, and are conducted away from heat recuperator E into a collecting hood 152, and thence, by duct 153, may be discharged into atmosphere.

The heated air enters a collecting manifold 138, and is then ducted by a diverging duct 139 into a combustion heat generator C. Fuel, arriving through nozzles 46, is mixed in atomized state with air and burned; the non-homogeneous mixture of hot air and burned gases arrives, by means not essential to this specification, into a gas mixing space 12 where the temperature of the mass of gases is equalized by turbulent motions and is subsequently ducted by peripheral duct 141 into collecting manifolds 143 and then through ducts 144 and 146 into axial ducts 132. Ducts 132 are disposed circumferentially around and concentrically with axial air ducts 130, and are separated from the outer walls of ducts 130 either by an air gap or an insulating layer 142 and by a pressure resistant wall 131, thereby limiting to the minimum the transfer of heat between the two ducts. From duct 132 the hot gases enter a distributing chamber 34, located circumferentially between compressed air duct 130 and the first radial stage of each centrifugal turbine B, in which the gases expand radially outward into hoods 18.

Power plants of this nature, operating with exhaust heat recuperators, necessarily have to be designed for lower cycle pressure ratios than gas turbines operating without exhaust heat recuperation. However, it is feasible to obtain higher thermal efficiency from thermodynamic cycles operating with well designed heat recuperators and ducting than is possible to reach with high pressure, non-recuperating gas turbines alone, provided thermodynamic efficiencies of the machines as well as the maximum cycle temperatures are comparably equal in both cases. The turbine arrangement with external or internal heat exchangers, however, is suitable for stationary power plants, such as central power stations, where space is available for recuperators and ducts, for fuel economy is important.

For transportation propulsion purposes, however, the previously described power plants, without heat recuperation, shown in Figs. 1, 5, 6, and 8, are eminently suitable due to their light weight and compact simplicity combined with relatively high thermal efficiency.

Fig. 11 discloses a power plant especially suitable for generation of pneumatic energy. A centripetal, double rotation compressor A draws atmospheric air through intake filters 36 into a peripheral hood 17. The compressor is equipped with a prerotation stage 19, circumferentially surrounding the radial compressor cascades. Said prerotation stage 19 is supported by peripheral ducting rings 20, and these in turn are secured by a radial rod structure 37 to intake hood 17. Air enters into the prerotation stage 19 and is directed by it into the radial cascades of compressor A, whereupon, after having been compressed, it is discharged into a central collecting chamber 13, whence it flows, in a proportional ratio, into two tubular shaft ducts 22 and 22', contained within the oppositely rotating shafts 4 and 4' respectively. The left duct 22' ends at a circular edge 170, letting the compressed air enter a diffusing duct 172 at its circular edge 171. Upon slowing down in diffuser 172, the compressed air enters an equalizing chamber 173 and is ducted away by pressure duct 121 for external useful purposes. The transition from the leftward rotating duct 22' to a stationary duct 172 is sealed by a rotating labyrinth sealing gland 160, contained in housing 161. Shaft 4, rotatably supported in bearings 5 and 6, contains air duct 22 which ends at a rotating circular edge 39, letting the compressed air enter a combustion heat generator C at a stationary circular edge 41. A circular radiant heat shield 11 surrounds duct 41.

The two side-disks 7 and 8 of the contra-rotating compressor are driven by a radial turbine B through shaft 4 and a set of gears coupled to shaft 4. The gear train consists of spiral bevel gears 70—71, spur gears 81—82—81, and a second set of bevel gears 70—71, identical to the first set. Shafts 83 and 76 are used for transmitting the torque. Shaft 76 may also be used for external power and for starting the power plant.

The disclosed power plants are suitable for the propulsion of transportation vehicles. In some instances of transportation propulsion, as well as in some stationary power plant applications of lower power outputs, only relatively small power plants may be required, not warranting the use of high pressure cycles and of double rotation compressors. In these cases only a single rotation compressor may be used. By way of an example, a preferred embodiment of the single rotation configuration is shown in Fig. 12. A is a single rotation, centripetal compressor, propelled through a hollow shaft 4, by a centrifugal turbine B. Turbine B also drives an alternator rotor 110 mounted on shaft 4, although any high speed power consumer or a gear train, similar to arrangements already previously disclosed, can be used instead of alternator D. The air enters the machine through duct 36 into a compressor intake hood 17, from which it is uniformly distributed into prerotation stage 19, supported by circumferential rings 20, which in turn are held by structural brackets 37 to the walls of hood 17. The centripetal, single rotation compressor A is similar to the centripetal, double rotation compressor described before and consists of a radial stator 7' held securely by a conical structure 174 fastened to intake hood 17. The rotating compressor stages are mounted on a sidedisk 8, which is mounted on shaft 4 rotated by the turbine. The compressor stages interleave with the stator stages, which act as a series of stationary stages which turn the flow of air so that it enters the compression stages in proper vectorial relationship. Compressed air is delivered to a central collecting chamber 13 at the center of the compressor A, from which either all or a portion of it is ducted into duct 22. Ducts 120 and 121 are for external use of pneumatic energy if so desired. The machine, consisting of compressor A, turbine B, heat generator C and alternator D forms a monoblock assembly, being joined together by peripheral structures 77 and 78, into a self-containing casing.

Fig. 13 shows another version of a single rotation power plant using axial flow machines. It will be recognized that this power plant is similar to the power plant shown in Fig. 12, except in that an axial flow compressor and an axial flow turbine are used instead of radial flow turbo machines. The embodiment consists of a centrally located tubular shaft 4, rotatably supported in bearings 165, 5, and 6. At the left end of shaft 4 and torque resistantly to it, is attached a compressor drum 8, located between bearings 165 and 5; a rotor 110, positioned in a stator 111 of an alternator D, is located between bearings 5 and 6 and a drum 9 of an axial flow turbine B is mounted on the right end of shaft 4. The stator of the machine is again of a monobloc layout, consisting of a stationary end duct housing 175 for ducting compressed air, an axial compressor stator cylinder 7', a compressor air intake hood 17, a connecting structure 77, an outer housing shell of alternator stator 176, a connecting structure 78, a turbine exhaust hood 18, an axial turbine cylinder 10, and combustion heat generator C. The air enters duct 36 and from it flows past a circular edge 169 into the cascade system of the axial flow compressor A, wherein it is compressed and discharged into duct 175.

The compressed air leaves duct 175 and then enters the rotating tubular duct 22, the latter being aerodynamically connected to the combustion heat generator C. Fuel is brought to heat generator C by fuel dispersing nozzles 46, positioned peripherally on said heat generator. Hot mixture of gases flows to axial flow turbine B, immediately adjacent to the heat generator C and expands in it while flowing axially through turbine cascades 52 to turbine exit, terminated by circular edge 168 of stator cylinder casing 10. The exhaust gases are collected in hood 18 and carried away from it by duct 49. It is to be noted that alternator D may be replaced with any other power consumers, driven directly or indirectly from shaft 4.

Another useful embodiment of a single rotation power plant is shown in Fig. 14, characterized by similar principles of construction as described before, except for the use of an axial flow compressor in combination with a centrifugal turbine, and the incorporation of a recuperating heat exchanger into the gas collecting hood of the turbine, the entire power plant being of a medium or low pressure thermodynamic cycle and of monobloc construction with no components located externally to it.

The axial flow compressor A and alternator D, shown in Fig. 14, are identical in their configuration to similar machines described already in connection with Figs. 13 and 12 and need no further description.

The compressed air arrives from compressor A by rotating tubular duct 22 in shaft 4 at a rotating circular edge 39 and upon leaving it, enters into a stationary duct 130 at stationary circular edge 41. Duct 130 is an integrally constituent part of a configuration called summarily a combustion heat generator C, consisting of a combustion chamber 44, a mixing chamber 12, an antiradiant heat shield 11, a turbine stator 10 and fuel dispersing nozzles 46, already familiar from previous drawings. The compressed air duct 130 is mounted concentrically within a substantially cylindrical shell 131 with circumferential, hollow cylinder-like space 142 intervening between the outer wall of duct 130 and the inner wall of shell 131, for separating the airflows and for minimizing heat transfer from chamber 12 and 44 into the air mass flowing in duct 130. Axial duct 130 conveys the compressed air into the first series of heat exchanger tubes 137, these tubes being located substantially transversely to the direction of flow of hot gases from turbine B in exhaust hood 18.

After absorbing heat in the tubes 137 from the exhaust gases, the compressed air enters a circumferential manifold chamber 14, where it is turned into a second series of heat exchanger tubes 137'. The heated air then enters a circumferential collecting manifold chamber 138, this chamber being connected by a duct 148 to a gas mixing chamber 12, and by a duct 146 to a combustion chamber 44.

Hot gases, leaving combustion chamber 44, are then mixed with the preheated air entering mixing chamber 12, whereupon they enter the centrifugal turbine B, expanding in its cascades and finally reaching the exhaust manifold 18 containing heat recuperator E; after releasing a part of the heat to said recuperator, the exhausted gas mixture is carried away as a relatively cool mass of gases by duct 49. A low potential pneumatic energy may be obtained, if desired, from the power plant by tapping the compressor exit duct 175 or heat generator C. The above is illustrated by the outlet ducts 120 and 121.

The gas turbine power plants disclosed in this specification utilize dynamic compressors, i. e., compressors in which the air is compressed by first imparting to the air to be compressed high kinetic energy and then converting this kinetic energy to potential energy, or pressure. Compressors of this type are commonly known in the art as axial and centrifugal compressors. This specification also discloses, in part, a centripetal dynamic compressor, which is more fully disclosed in the said copending application entitled "Centripetal Subsonic Compressor," Serial No. 179,028, filed August 12, 1950 in the name of the inventors in this case. Supersonic versions of the dynamic compressors are disclosed in the copending applications 228,166, 217,347 and 216,305 in the name of V. H. Pavlecka, a co-inventor in this case.

What is claimed as new is:

1. A gas turbine power plant, comprising a hollow unobstructed duct shaft having an intake and a discharge end both extending axially of said duct shaft; means for journaling said shaft; a centripetal air compressor including a rotor driven by said shaft and having an axial discharge port directed into the intake end of said shaft; means defining a stationary combustion chamber having an axial intake port communicating with the discharge end of said shaft and an annular, discharge port redirected toward said shaft; means for introducing fuel into said combustion chamber; and a gas turbine including a rotor for driving said shaft and having an annular intake port surrounding said axial intake port and positioned to receive products of combustion from said combustion chamber.

2. A gas turbine power plant, comprising a centripetal flow multiple stage compressor; a centrifugal flow multiple stage gas turbine; a hollow shaft having an intake end and a discharge end extending axially of said shaft and connecting the rotating elements of said turbine and compressor; a reverted stationary combustion chamber having coaxial intake and discharge ports, said hollow shaft and combustion chamber forming fluid passages connecting the said compressor and turbine.

3. A gas turbine power plant, comprising a rotatable hollow shaft, the hollow portion of said shaft constituting the central duct of said power plant; a stationary, toroidal combustion heat generator having an axial intake port registering with said central duct, and an annular discharge port redirected over and around said axial intake port, a multiple stage gas turbine including a stator structure connected to said heat generator to receive the products of combustion therefrom, and a turbine rotor structure secured to said shaft; and a multiple stage dynamic flow compressor, including a rotor secured to said shaft, said rotor being fluid-dynamically coupled to said central duct.

4. A gas turbine power plant as defined in claim 3 in which said toroidal combustion heat generator comprises said axial intake port constituting an axial continuation of said central duct, an inner toroid having fuel nozzles, said inner toroid constituting a combustion chamber of said heat generator, an outer toroid surrounding the inner toroid, and annular intake and output ports for said toroids.

5. A gas turbine power plant as defined in claim 3 in which said combustion heat generator also includes a third toroid, said third toroid being positioned between said inner and outer toroids on one side and the turbine on the other side, said third toroid constituting a vortex mixing chamber for the gases leaving said inner and outer toroids.

6. A gas turbine power plant, comprising a pair of hollow shafts each having fluid intake and discharge ends; means mounting said shafts for rotation in opposite directions; a multiple stage centripetal compressor including multiple blade rotor structures mounted on each of said shafts and terminating in discharge ducts directed axially into the intake ends of said shafts; and a gas turbine for at least one of said shafts, said turbine including a rotor structure mounted on the discharge end of said shaft, and a stator beyond the discharge end of said shaft; and a reverted torus shape combustion heat generator having an intake end registering with the discharge end of said shaft, and an annular discharge end directed axially toward said shaft and into said stator.

7. A gas turbine power plant, comprising first and second hollow shafts, each having fluid intake and discharge ends; means mounting said shafts for rotation in opposite directions; a multiple stage centripetal compressor including first and second multiple blade rotor structures mounted respectively on said first and second shafts, each rotor structure terminating in a discharge duct directed axially into the intake end of the respective shaft; a gas turbine at the discharge end of at least said first shaft, said gas turbine including a rotor structure secured to said first shaft, and a stator structure including an intake port, a combustion heat generator including an intake duct registering with the discharge end of said shaft and an annular discharge port registering with the intake port of said turbine, and a combustion chamber between said intake duct and said discharge port; and means for introducing fuel into said combustion chamber.

8. A gas turbine power plant, comprising a hollow shaft having an intake end and a discharge end; a compressor driven by said shaft and having a compressed air discharge duct directed axially into the intake end of said shaft; a combustion heat generator including an inner toroid chamber and an encompassing outer toroid chamber, both having intake ports communicating with the discharge end of said shaft, and both having annular discharge ports redirected toward said shaft, and means for introducing and burning a fuel in said inner toroid chamber; a gas turbine including a rotor mounted on and adapted to drive said shaft, and a stator having an intake port registering with the discharge ports of said chambers.

9. A gas turbine power plant, comprising a hollow shaft having an intake end and a discharge end; a compressor driven by said shaft and having a compressed air discharge duct directed axially into the intake end of said shaft; a combustion heat generator defining an inner toroid chamber and an encompassing outer toroid chamber, both of said chambers having central intake ports communicating with the discharge end of said shaft, both having annular discharge ports redirected toward said shaft and both defined in part by a common heat exchanging wall, means for introducing and burning fuel in said inner toroid chamber, said combustion heat generator also defining a toroid vortex chamber communicating with the discharge ends of said inner and outer toroid chambers; a turbine including a turbine rotor structure secured to and driving said shaft, a turbine stator, and means defining an intake for said turbine, said means communicating on one side with said toroid vortex chamber and on the other side with said turbine.

10. A gas turbine power plant as set forth in claim 9 wherein the confronting ends of said shaft and said combustion heat generator define a bypass port, and said stator and rotor define therebetween a passage communicating with a stage of said turbine to assist the cooling of said rotor and stator in the region of said toroid vortex chamber.

11. A gas turbine power plant, comprising a hollow shaft having an intake end and a discharge end; a compressor driven by said shaft and having a compressed air discharge duct directed axially into the intake end of said shaft; a combustion heat generator defining an inner toroid chamber and an encompassing outer toroid chamber, both of said chambers having central intake ports communicating with the discharge end of said shaft, both of said chambers having annular discharge ports redirected toward said shaft, said chambers being defined in part by a common heat exchanging wall, means for introducing and burning a fuel in said inner toroid chamber, said combustion heat generator also defining a toroid vortex chamber communicating with the discharge ends of said inner and outer toroid chambers, and a centrifugal turbine rotor structure including a turbine rotor structure secured to and driving said shaft and carrying a series of coaxial turbine blade rings, a turbine stator structure carrying a series of turbine blade rings interleaved with the rings of said rotor, said turbine stator including an annular intake port communicating with said toroid vortex chamber.

12. A turbine power plant, comprising a multiple stage centripetal compressor; a multiple stage centrifugal turbine; a hollow shaft connecting the rotating portions of said compressor and turbine and forming a conduit for compressed air from said compressor; a fixed combustion heat generator covering the discharge end of said hollow shaft and defining an intake port registering with said shaft and a discharge port communicating with said turbine, and means incorporated in said compressor and turbine to define opposed pressure areas for counteracting end thrust on said shaft.

13. A turbine power plant as set forth in claim 12 wherein said pressure counteracting means in said compressor comprises walls defining a series of chambers displaced axially from the stages of said compressor, each chamber embracing a higher and lower pressure stage and having means for sealing each chamber from the corresponding lower pressure stage, each chamber having an annular duct communicating with its corresponding higher pressure stage; and wherein said pressure counteracting means in said turbine comprises walls defining a series of chambers displaced axially from the stages of said turbine, each embracing a higher and a lower pressure stage, and means sealing each chamber from the corresponding higher pressure stage, each chamber having an annular duct communicating with its corresponding lower pressure stage.

14. A turbine power plant, comprising a multiple stage aerodynamic compressor; a multiple stage aerodynamic turbine; a hollow shaft connecting the rotating portions of said compressor and turbine forming a conduit for compressed air from said compressor; a fixed combustion heat generator covering the discharge end of said hollow shaft and defining an intake port registering with said shaft and a discharge port communicating with said turbine; said combustion heat generator including a toroidal inner chamber, a toroidal outer chamber sharing a heat-transferring common wall with said inner chamber, both of said chambers also sharing the intake and discharge ports of said generator; means for introducing fuel into said inner chamber to establish a primary combustion region, and a mixing chamber interposed between said turbine and said toroid chambers for receiving the products of combustion from said inner chamber supplemented by air from said outer chamber.

15. A turbine power plant, comprising a multiple stage aerodynamic compressor; a multiple stage aerodynamic turbine; a hollow shaft connecting the rotating portions of said compressor and turbine and forming a conduit for compressed air from said compressor; a fixed combustion heat generator covering the discharge end of said hollow shaft and defining an intake port registering with said shaft and a discharge port communicating with said turbine; said combustion heat generator including a toroidal inner chamber, a toroidal outer chamber sharing a heat-transferring common wall, both of said chambers also sharing the intake and discharge ports of said generator; means for introducing fuel into said inner chamber to establish a primary combustion region, and a mixing chamber interposed between said turbine and said chambers for receiving the products of combustion from said inner chamber supplemented by air from said outer chamber; the intake port of said generator and the confronting end of said shaft defining a bypass port; and a cooling duct defined in part by the rotating portion of said turbine and a wall of said mixing chamber and communicating between said bypass port and a stage of said turbine.

16. A turbine power plant as set forth in claim 15 wherein the wall of said mixing chamber which defines said cooling duct in part comprises a plurality of sheets having reflecting surfaces facing toward said mixing chamber and spaced apart from each other, the outermost sheet constituting the surface of said cooling duct, said wall occupying a region subjected to the radiant heat from said combustion region and said mixing chamber.

17. A gas turbine power plant comprising a rotatable hollow shaft having first and second ends, the hollow portion of said shaft constituting a hollow duct, a dynamic compressor having a rotor structure mounted at and connected to said first end of said shaft, an accelerating duct connecting the output of said compressor to said shaft duct whereby the output of said compressor discharges into said shaft duct, a turbine having a rotor mounted at and connected to the second end of said shaft, and a combustion heat generator having input and output sides, the input side of said combustion heat generator being aerodynamically connected to said shaft duct to receive the output of said compressor, and the output side of said combustion heat generator being aerodynamically connected to said turbine, whereby the rotor of said turbine is capable of rotating the rotor structure of said compressor through said shaft when said power plant is in operation.

18. A gas turbine power plant comprising a centripetal compressor for compressing air used as a component of kinetic energy of said plant, said centripetal compressor having a plurality of compression stages integrated into at least one rotor, said compressor receivng said air along its outermost perimeter and compressing said air toward the region located at the center of rotation of said rotor, a heat generator aerodynamically connected to the output of said compressor for receiving on its input side the compressed air from said region, a source of fuel connected to and supplying fuel to said heat generator, said heat generator having means for burning said fuel in said air to produce heated gases, and a centrifugal turbine having at least a single rotor aerodynamically connected to said heat generator for receiving said gases from said heat generator for converting the kinetic energy of said heated gases into mechanical energy.

19. A gas turbine power plant comprising a centripetal compressor having first and second rotor structures interleaved with each other, first and second combustion heat generators aerodynamically connected to said compressor for receiving the output of said centripetal compressor, first and second turbines, said first turbine being aerodynamically connected to said first combustion heat generator for receiving the output of said first combustion heat generator, and said second turbine being aerodynamically connected to said second combustion heat generator for receiving the output of said second combustion heat generator, first means mechanically interconnecting said first rotor and said first turbine for rotating said first rotor structure of said centripetal compressor in clockwise direction from said first turbine, and second means mechanically interconnecting said second rotor and said second turbine for rotating said second rotor structure of said centripetal compressor in a counterclockwise direction from said second turbine.

20. A gas turbine power plant as defined in claim 19 in which said first rotor structure comprises a first side disc with a plurality of concentric compressor stages mounted on said first side disc, and said second rotor structure comprises a second side disc with a plurality of concentric compressor stages mounted on said second side disc, the stages on the first disc interleaving with the stages on the second disc.

21. A gas turbine as defined in claim 19, in which said centripetal compressor comprises a stationary prerotation stage and at least one compression stage in each of said first and second rotor structures.

22. A gas turbine power plant as defined in claim 19, in which said first and second turbines are radial turbines having first and second turbine rotors respectively, said first turbine rotor being connected to said first means, and said second turbine rotor being connected to said second means.

23. A gas turbine power plant as defined in claim 19, in which said first and second means are first and second shafts respectively, said shafts constituting the driving means of said power plant.

24. A gas turbine power plant as defined in claim 19, in which said first and second means are first and second shafts respectively, a load connected to and driven by said shafts, and means for proportioning the power delivered to said load by the respective shafts as an inverse function of the power delivered by the respective shafts to said first and second rotor structures of said compressor.

25. A gas turbine power plant as defined in claim 19, in which said first and second means are first and second shafts respectively, said power plant also including first and second electric generators, each having a rotor and a stator, the rotors of said generators being mounted directly and respectively on said first and second shafts.

26. A gas turbine system comprising a centripetal compressor having first and second rotor structures interleaving with each other, first and second hollow shafts having inner and outer ends, respectively, said inner ends being respectively connected to said first and second rotor structures, said rotor structures and said shafts having means for discharging compressed air into said hollow shafts, a first turbine having a rotor connected to the outer end of said first shaft to drive said first rotor structure in one direction, a second turbine having a rotor connected to the outer end of said second shaft to drive said second rotor structure in the opposite direction, each turbine having low and high pressure sides, a first combustion heat generator interconnecting the outer end of the first shaft with the high pressure side of said first turbine, and a second combustion heat generator interconnecting the outer end of said second shaft with the high pressure side of said second turbine, whereby the compressed air from said compressor is delivered to said turbines through the respective shafts and combustion heat generators.

27. A gas turbine system as defined in claim 26 which also includes means for delivering power to an external load from said first shaft.

28. A gas turbine system as defined in claim 26, in which said first turbine is an external and internal power turbine and said second turbine is an internal power turbine.

29. A gas turbine system as defined in claim 26, in which the inner diameters of said first and second hollow shafts have a ratio which is a function of the ratio of the power ratings of said first and second turbines.

30. A gas turbine system as defined in claim 26, which also includes a first source of fuel connected to said first combustion heat generator, a second source of fuel connected to said second combustion heat generator, and means for independently regulating the amount of fuel supplied by said first and second sources of fuel to said first and second combustion heat generators, respectively.

31. A gas turbine system comprising a centripetal, contra-rotatable compressor having first and second contra-rotatable rotor structures, first and second shafts, said rotor structures being connected respectively to first and second shafts, first and second turbines connected, respectively, to said shafts, said turbines being adapted to rotate said first and second rotor structures in opposite directions through said first and second shafts, first and second sets of gears connected respectively to said shafts, third and four rotatable shafts connected respectively to first and second loads driven respectively by said first and second turbines, and means interconnecting said third and fourth shafts, said means fixing the angular velocity of said third shaft with respect to the angular velocity of said fourth shaft.

32. A gas turbine power plant comprising a centripetal compresor having a first and second rotary structures, first and second hollow shafts connected respectively to said first and second rotary structures, first and second turbines each having high and low pressure sides and being respectively connected to said first and second shafts, said first turbine rotating said first rotary structure in one direction, and said second turbine rotating said second rotary structure in the opposite direction, and a common combustion heat generator having an input end and an output end, first means for connecting the input end of said heat generator to said first and second shafts, and second means for connecting the output end of said heat generator to the high pressure sides of said turbines.

33. A gas turbine power plant as defined in claim 32, which also includes a heat exchanger having a first plurality of ducts constituting a part of said first means, and a second plurality of ducts in heat-exchanging relationship with said first set of ducts, said second set of ducts receiving the exhaust gases of said first and second turbine and discharging them into an ambient atmosphere.

34. A gas turbine power plant comprising a centripetal contra-rotating air compressor having first and second rotary structures, first and second shafts connected to said first and second rotary structures, respectively, a turbine connected to one of said shafts and having a low and high pressure sides, a combustion heat generator having an input end receiving compressed air from said compressor, and an output end discharging said compressed air and the products of combustion into said high pressure side of said turbine, and means connected to and driven by said turbine, for rotating said first rotary structure in one direction and said second rotary structure in the opposite direction.

VLADIMIR H. PAVLECKA.
FREDERICK DALLENBACH.

REFERENCES CITED

The following references are of record in the file of this patent:

UNITED STATES PATENTS

| Number | Name | Date |
|---|---|---|
| 1,062,099 | Haglund | May 20, 1913 |
| 1,276,260 | Parrish | Aug. 20, 1918 |
| 1,319,752 | Brown | Oct. 28, 1919 |
| 1,868,143 | Heinze | July 19, 1932 |
| 1,959,795 | Lysholm | May 22, 1934 |
| 1,972,377 | de Laderrière | Sept. 4, 1934 |
| 2,028,603 | Heinze | Jan. 21, 1936 |
| 2,256,198 | Hahn | Sept. 16, 1941 |
| 2,318,990 | Doran | May 11, 1943 |
| 2,336,232 | Doran | Dec. 7, 1943 |
| 2,357,778 | Beaven | Sept. 5, 1944 |
| 2,371,889 | Hermitte | Mar. 20, 1945 |
| 2,391,779 | Griffith | Dec. 25, 1945 |
| 2,471,892 | Price | May 31, 1949 |

FOREIGN PATENTS

| Number | Country | Date |
|---|---|---|
| 368,318 | Great Britain | Mar. 4, 1932 |
| 387,166 | Germany | Dec. 21, 1923 |